(12) United States Patent
Nagel et al.

(10) Patent No.: US 9,488,084 B2
(45) Date of Patent: Nov. 8, 2016

(54) DEVICE FOR THE TREATMENT OF EXHAUST GASES AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Thomas Nagel, Engelskirchen (DE); Ferdi Kurth, Mechernich (DE)

(73) Assignee: EMITEC Gesellschaft fuer Emissionstechnologie mbH, Lomar (DE)

( * ) Notice: Subject to any disclaimer, the term of this patent is extended or adjusted under 35 U.S.C. 154(b) by 0 days.

(21) Appl. No.: 14/183,729

(22) Filed: Feb. 19, 2014

(65) Prior Publication Data
US 2014/0165541 A1    Jun. 19, 2014

Related U.S. Application Data

(63) Continuation of application No. PCT/EP2012/064294, filed on Jul. 20, 2012.

(30) Foreign Application Priority Data

Aug. 19, 2011    (DE) .................. 10 2011 110 664

(51) Int. Cl.
*F01N 3/10*    (2006.01)
*F01N 3/20*    (2006.01)
(Continued)

(52) U.S. Cl.
CPC ............ *F01N 3/2026* (2013.01); *F01N 3/2842* (2013.01); *F01N 13/0097* (2014.06); *F01N 2330/02* (2013.01); *F01N 2410/00* (2013.01); *F01N 2450/22* (2013.01); *Y02T 10/26* (2013.01)

(58) Field of Classification Search
CPC ............ F01N 13/0097; F01N 3/2026; F01N 3/2842; F01N 2330/02; F01N 2410/00; F01N 2450/22; Y02T 10/26
USPC .................. 60/284, 286, 295, 297, 303, 324
See application file for complete search history.

(56) References Cited

U.S. PATENT DOCUMENTS 5,070,694 A * 12/1991 Whittenberger ................ 60/300
5,094,821 A *  3/1992 Hitachi et al. ................. 422/180
(Continued)

FOREIGN PATENT DOCUMENTS

CN    1420260 A    5/2003
DE    4017360 A1 * 12/1991 ............... F01N 3/28
(Continued)

*Primary Examiner* — Jesse Bogue
*Assistant Examiner* — Matthew T Largi
(74) *Attorney, Agent, or Firm* — Laurence A. Greenberg; Werner H. Stemer; Ralph E. Locher

(57) ABSTRACT

A device for the treatment of exhaust gases includes at least a first honeycomb body through which the exhaust gas can flow and a second honeycomb body through which the exhaust gas can flow. The first honeycomb body and the second honeycomb body are disposed in series in an exhaust line and a first cross-sectional area of the first honeycomb body is smaller than a second cross-sectional area of the second honeycomb body. The first honeycomb body is disposed eccentrically in the exhaust line. One of the honeycomb bodies, which is electrically heatable, can be connected to a multiplicity of supporting honeycomb bodies for easy installation in a multiplicity of different vehicle models. A motor vehicle having the device is also provided.

12 Claims, 3 Drawing Sheets

(51) Int. Cl.
*F01N 3/28* (2006.01)
*F01N 13/00* (2010.01)

(56) References Cited

U.S. PATENT DOCUMENTS

| | | | | |
|---|---|---|---|---|
| 5,140,812 | A | * | 8/1992 | Cornelison et al. ............. 60/300 |
| 5,140,813 | A | * | 8/1992 | Whittenberger ................ 60/300 |
| 5,149,508 | A | * | 9/1992 | Bullock ........................ 422/174 |
| 5,177,961 | A | * | 1/1993 | Whittenberger ................ 60/300 |
| 5,278,125 | A | | 1/1994 | Iida et al. |
| 5,370,943 | A | | 12/1994 | Brueck |
| 5,382,774 | A | | 1/1995 | Brueck |
| 5,413,767 | A | * | 5/1995 | Breuer ................... F01N 3/2026 422/174 |
| 5,444,978 | A | * | 8/1995 | Yoshizaki et al. .............. 60/276 |
| 5,494,642 | A | * | 2/1996 | Sanada ........................ 422/174 |
| 5,525,309 | A | * | 6/1996 | Breuer .................... B01J 35/04 422/174 |
| 5,582,803 | A | | 12/1996 | Yoshizaki et al. |
| 5,768,889 | A | * | 6/1998 | Maus ................... B01J 35/0033 422/171 |
| 7,048,895 | B2 | | 5/2006 | Shirahata et al. |
| 7,377,102 | B2 | | 5/2008 | Roach et al. |
| 8,302,384 | B2 | | 11/2012 | Konieczny et al. |
| 2003/0161766 | A1 | * | 8/2003 | Bruck .................. B01D 53/885 422/174 |
| 2007/0056263 | A1 | | 3/2007 | Roach |
| 2008/0223019 | A1 | * | 9/2008 | Gonze et al. ................... 60/286 |
| 2010/0126984 | A1 | | 5/2010 | Konieczny et al. |
| 2012/0097659 | A1 | | 4/2012 | Duesterdiek |

FOREIGN PATENT DOCUMENTS

| | | | | |
|---|---|---|---|---|
| DE | 19602266 A1 | | 7/1997 | |
| DE | 102007025419 A1 | | 12/2008 | |
| DE | 102009018182 | * | 10/2010 | ............... F01N 3/20 |
| DE | 102009018182 A1 | | 10/2010 | |
| JP | H05509037 A | | 12/1993 | |
| JP | H10506167 A | | 6/1998 | |
| JP | 2001027115 A | | 1/2001 | |
| JP | 2008101569 A | | 5/2008 | |
| JP | 2010528219 A | | 8/2010 | |
| RU | 2141040 C1 | | 11/1999 | |
| WO | 9213636 A1 | | 8/1992 | |
| WO | 9610127 A1 | | 4/1996 | |
| WO | WO 9610127 A1 | * | 4/1996 | ............... F01N 3/20 |

* cited by examiner

DEVICE FOR THE TREATMENT OF EXHAUST GASES AND MOTOR VEHICLE HAVING THE DEVICE

CROSS-REFERENCE TO RELATED APPLICATION

This is a continuation, under 35 U.S.C. §120, of copending International Application No. PCT/EP2012/064294, filed Jul. 20, 2012, which designated the United States; this application also claims the priority, under 35 U.S.C. §119, of German Patent Application DE 10 2011 110 664.6, filed Aug. 19, 2011; the prior applications are herewith incorporated by reference in their entirety.

BACKGROUND OF THE INVENTION

Field of the Invention

The present invention relates to a device for the treatment of exhaust gases. The device has at least a first honeycomb body and a second honeycomb body, through which an exhaust gas can flow and which are disposed in series in an exhaust line. In particular, the present invention relates to such devices in which the first honeycomb body can be electrically heated. The invention also relates to a motor vehicle having the device.

In order to limit the emissions of pollutants from internal combustion engines, especially those in motor vehicles, catalytic converters have long been used to detoxify the exhaust gas. In order to ensure that catalytically assisted conversion of the pollutants takes place, the exhaust gas and/or the catalytic converter must have a minimum temperature. Especially after the internal combustion engine has been cold-started or restarted, that minimum temperature has not yet been reached. An attempt is therefore made to raise the temperature of the exhaust gas and/or of the catalytic converter by using electrically operated heating elements.

International Publication No. WO 92/13636 A1, corresponding to U.S. Pat. Nos. 5,525,309; 5,382,774 and 5,370,943, for example, discloses a honeycomb body configuration having a plurality of disks supported against one another. In that case, the honeycomb body configuration has at least two disks, which are spaced apart and through which the exhaust gas flows in succession. Supporting pins are disposed close to an axis in order to connect the disks to one another.

International Publication No. WO 96/10127 A1, corresponding to U.S. Pat. No. 5,768,889, furthermore shows an electrically heated honeycomb body which is supported on a second honeycomb body mounted downstream through supporting pins and through supporting elements disposed about the circumference of the honeycomb body.

The heated honeycomb body must be specially matched to the exhaust line with respect to shape and size for each model of a motor vehicle. Thus, a large number of variants are required, especially also because of the matching of the two honeycomb bodies to one another and the adaptation to the exhaust system. Relevant structural criteria in that case are, for example, the type and position of the supporting pins, the electrical contacting, the electrical insulation, the flow behavior of the exhaust gas, thermal decoupling from the rest of the system, and many other factors. The provision of such heating systems is thus associated with increased costs and/or with increased outlay for assembly and/or increased outlay for production.

SUMMARY OF THE INVENTION

It is accordingly an object of the invention to provide a device for the treatment of exhaust gases and a motor vehicle having the device, which overcome the hereinafore-mentioned disadvantages and at least partially solve the highlighted problems of the heretofore-known devices and motor vehicles of this general type and with which, in particular, a heated honeycomb body can be used in a large number of different models of vehicles.

With the foregoing and other objects in view there is provided, in accordance with the invention, a device for the treatment of exhaust gases comprising, at least, one first honeycomb body through which the exhaust gas can flow and one second honeycomb body through which the exhaust gas can flow. The first honeycomb body and the second honeycomb body are furthermore disposed in series in an exhaust line. In this case, a first cross-sectional area of the first honeycomb body is smaller than a second cross-sectional area of the second honeycomb body, and the first honeycomb body is disposed eccentrically in the exhaust line.

In particular, the first honeycomb body and the second honeycomb body each have channels between an inlet side and an outlet side, through which the exhaust gas flows through the honeycomb body from the inlet side to the outlet side. In this case, the honeycomb bodies can be extruded from a ceramic material in a known manner or can be formed from one or more stacks of sheet metal layers, which have been wound or coiled to form a honeycomb body with channels. The channels can be tubular in shape, for example, but it is also possible for them to be branched, curved, kinked or the like. It is likewise possible for at least some of the channels to have openings, thus allowing gas exchange within the honeycomb body. It is furthermore possible for the honeycomb body to form constrictions, widened portions, flow guiding surfaces or the like in at least some of the channels, thereby influencing the flow behavior of the exhaust gas and/or of the particles contained therein.

The first honeycomb body is preferably an electrically heatable honeycomb body, which is generally disposed ahead of the second honeycomb body in the exhaust gas flow direction, i.e. the exhaust gas makes contact or flows through it first.

The second honeycomb body is itself not electrically heatable or there is no flow of electric current through it. The first honeycomb body is therefore electrically insulated with respect to the second honeycomb body. In particular, the first honeycomb body and the second honeycomb body are formed by separate components (e.g. sheet metal layers). It is furthermore preferred if the ends (inlet side and outlet side) of the honeycomb bodies are flat or level, thus making it possible to use (identical) supporting pins, in particular, to set a desired distance between them. It is furthermore preferred that all of the sheet metal layers of the honeycomb bodies should rest on the component forming the housing at both ends and over the entire axial length of the honeycomb bodies.

In particular, a first length of the first honeycomb body in the direction of flow is (significantly) less than a second length of the second honeycomb body in the direction of flow, in particular no more than ⅓ or even no more than ⅕ thereof. In the case of a ceramic honeycomb body, heatability is achieved, in particular, by embedding electrically conductive material in the ceramic material. In the case of metal honeycomb bodies, the sheet metal layers are supplied directly with a current. During operation, an exhaust gas flow thus passes through the first honeycomb body, thereby being heated, and then passes into the second honeycomb body.

The second honeycomb body generally has a catalytic coating, with the aid of which the pollutants in the exhaust gas are converted. In this case, the first honeycomb body can be activated selectively in order to set an appropriate temperature for this catalytic reaction. The honeycomb body can likewise have a filtering function or a particulate collecting function, wherein the thermal energy produced in the first honeycomb body can be used for regeneration. It is likewise possible for the second honeycomb body to be an adsorber, which stores and releases exhaust gas constituents in predetermined temperature ranges. In this case, the first honeycomb body could be activated selectively in order to influence this behavior accordingly.

The term cross-sectional area of the honeycomb bodies is intended in each case to refer to the area of the honeycomb body transversely to the direction of flow and, in particular, transversely to the direction of the (tubular or rectilinear) channels in the honeycomb body. In this case, the cross-sectional area is, in particular, the area covered by the material forming the channels and by the channels themselves. In the case of a circular cross section of the honeycomb body, the cross-sectional area is therefore the circular area covered by the overall honeycomb body. In this case, the first honeycomb body has a smaller cross-sectional area than the second honeycomb body, thereby, in particular, creating a degree of freedom for aligning the first honeycomb body relative to the second honeycomb body.

The first honeycomb body is furthermore disposed eccentrically in the exhaust line. This means, in particular, that a first central axis of the first honeycomb body is offset relative to a center line of the exhaust line at the point at which the first honeycomb body is disposed, while the first central axis of the first honeycomb body and the center line of the exhaust line are (substantially) parallel. In other words, this means, in particular, that the first honeycomb body does not completely cover the exhaust line, and the exhaust line is partially covered by the first honeycomb body in a manner which is not symmetrical with respect to the axis. However, it is preferred if the second honeycomb body completely covers the exhaust line and/or if the second honeycomb body is disposed centrally in the exhaust line. By virtue of the fact that the first honeycomb body is not disposed centrally in the exhaust line, it is possible to combine a single form of this first honeycomb body with a large number of different variant embodiments of the exhaust lines and/or of the second honeycomb bodies without a major outlay for assembly.

With the objects of the invention in view, there is also provided a device for the treatment of exhaust gases comprising, at least, one first honeycomb body through which the exhaust gas can flow and one second honeycomb body through which the exhaust gas can flow, wherein the first honeycomb body and the second honeycomb body are disposed in series and interconnected. Provision is furthermore made for a first cross-sectional area of the first honeycomb body to be smaller than a second cross-sectional area of the second honeycomb body, and for the first honeycomb body to be disposed eccentrically relative to the second honeycomb body.

Insofar as the same terms are used for this further aspect of the invention, reference can be made to the corresponding explanations.

This device now relates not (only) to the component configuration mounted in the exhaust line but possibly also to a product which already has a corresponding noncentral configuration of the two honeycomb bodies outside the exhaust line. In this case, the first honeycomb body and the second honeycomb body are preferably aligned in the same way but disposed axially parallel. The first honeycomb body has a first central axis, which points, in particular, in the direction of the flow channels and, in particular, also forms an axis of symmetry of the first honeycomb body. The second honeycomb body furthermore has a second central axis, which points, in particular, in the direction of the flow channels thereof and preferably forms an axis of symmetry of the second honeycomb body. The first central axis of the first honeycomb body and the second central axis of the second honeycomb body are offset parallel to one another. The first honeycomb body and the second honeycomb body are fixed in position relative to one another, in particular by using suitable fixing devices. These fixing devices can include, for example, supporting pins, a holding structure or the like, which are connected directly and/or indirectly to both honeycomb bodies. In particular, the fixing devices can project into both honeycomb bodies (or the channels thereof), and/or can be secured at least on the outside of one of the honeycomb bodies. It is also possible for the fixing devices to be securely connected to the honeycomb body and/or to the accessories thereof (electrodes, insulation, housing, etc.). The fixing devices or fixings preferably insulate the first honeycomb body electrically relative to the second honeycomb body.

As a very particularly preferred option, the first honeycomb body is positioned eccentrically both relative to an exhaust line and relative to the second honeycomb body (in other words also off-center and/or offset transversely).

It is furthermore also preferred if a projection on the first cross-sectional area of the first honeycomb body (in the direction of the first and/or second central axis) lies fully within the second cross-sectional area of the second honeycomb body. This means, in particular, that the overlap ratio achieved corresponds substantially to the relation of the two cross-sectional areas.

It is likewise preferred if the distance between the outlet side of the first honeycomb body and the inlet side of the second honeycomb body is less than the extent of one of the honeycomb bodies in the direction of the central axis. In particular, this distance is less than the extent of the narrowest honeycomb body of this configuration in the direction of the central axes. As a very particularly preferred option, this distance is less than 50 mm [millimeters] or even less than 20 mm.

In accordance with another advantageous feature of the invention, the first honeycomb body is secured in an exhaust line and connected to the exhaust line in an electrically conductive manner by using a welded joint or a soldered or brazed joint.

With respect to the embodiment of the welded joint/soldered joint, it should first of all be pointed out that it is, in particular, also corrosion resistant and resistant to high temperatures. The soldered joint is therefore produced by the "hard soldering" (brazing) method, in particular. A welded joint/soldered joint can be produced quickly by simple technical measures and is therefore preferred. Nevertheless, other suitable material connections (all joints in which the partners in the joint are held together by atomic and/or molecular forces; they are predominantly permanent joints at the same time, which can only be separated by destroying the joining material) can also be chosen.

This furthermore means, in particular, that the first honeycomb body rests (directly) against the exhaust line at least at one point or, in particular, also along a line. As a very particularly preferred option, just one single welded joint or soldered or brazed joint is provided. The welded joint/soldered or brazed joint also provides electrical contacting of the first honeycomb body. Through the use of the electrically conductive connection to the exhaust line, the first honeycomb body is preferably connected to an (electrical) ground. Since the first honeycomb body is disposed eccentrically in the exhaust line, a spacing or a gap is formed between the exhaust line and the first honeycomb body on the side opposite the welded joint/soldered or brazed joint. In the case of an exhaust line with a circular cross-section and a circular first honeycomb body, a gap with a crescent-shaped cross section, for instance, is formed between the first honeycomb body and the exhaust line. Through the use of a welded joint/soldered or brazed joint at one point or on a line, the first honeycomb body, which is smaller than a conventional exhaust line for example, can be secured in an exhaust line in a simple manner on a large number of models of vehicles. Joining by using a simple spot weld or a simple soldered or brazed joint allows significantly better series manufacture since it is possible to dispense with a separate electrode for this ground connection.

In accordance with a further feature of the invention, a gap is furthermore preferably formed between the first honeycomb body and an exhaust line, and the gap forms a through flow opening. Preferably, just one single through flow opening is formed, which may be traversed (only) by (at least) one electrical connection. This also means that the gap formed in the exhaust line by the eccentric configuration of the first honeycomb body is not filled by filling material, holding material, flow guiding structures, a seal or the like. Thus, some of the exhaust gas flow does not pass through the first honeycomb body but can flow past the first honeycomb body through the gap. The gap thus forms a kind of bypass for the first honeycomb body. As far as possible, this gap can be aligned in such a way relative to the exhaust line that it is disposed, for example, in the lee or flow shadow of an upstream bend, widened portion etc. of the exhaust line, thus enabling the bypass flow to be kept small. However, this is not mandatory.

In accordance with an added feature of the invention, a gap having an angle-dependent gap width is formed between the first honeycomb body and an exhaust line, and the first honeycomb body can be connected to a power source in an electrically insulated manner through the exhaust line by using at least one electrical conductor, wherein the at least one electrical conductor extends through the gap. The electrical conductor (of which there is preferably just one single instance) can be formed by a wire or by a correspondingly shaped metallic material, e.g. in the manner of an electrode (see, for example, the prior art mentioned at the outset).

The gap width is, in particular, the spacing between the first honeycomb body and the exhaust line, wherein the spacing is measured in the radial direction in a cross section, starting from the first central axis of the first honeycomb body. Since the first honeycomb body is disposed eccentrically in the exhaust line, the gap width is not the same in all directions, starting from the first central axis. On the contrary, the gap width changes, starting from a reference direction, with an angle that changes relative to the reference direction. The electrical conductor is surrounded by an electrical insulation and passed through the exhaust line, allowing an electrical potential or a current to be applied to the first honeycomb body via the electrical conductor. Moreover, current flows through the first honeycomb body through the welded joint/soldered or brazed joint. In particular, the electrical conductor is passed through the gap in a straight line and in the radial direction from the first honeycomb body. In particular, the electrical conductor is passed through the gap at a point at which the gap width is at least 1 cm [centimeter] or even at least 1.5 cm but preferably no more than 3 cm, particularly preferably no more than 2 cm. By virtue of the fact that the electrical conductor is not passed through the exhaust line at the welded joint/soldered or brazed joint and/or directly in the vicinity of the welded joint/soldered or brazed joint, the electrical conductor can also act as a (radial) counter bearing for the first honeycomb body.

In the event that the first honeycomb body forms a plurality of current paths (capable of separate control or separate activation), the following electrical contacting is preferred. In the device, the first honeycomb body can be connected to respective power sources by a plurality of electrical conductors, and the electrical conductors are connected to the first honeycomb body in the region of equal gap widths. In particular, 2, 3 or 4 such electrical conductors (and hence also separately controllable or separately activatable current paths in the first honeycomb body) can be provided. In particular, the electrical conductors are disposed between the first honeycomb body and the exhaust line in a (common) plane transverse to the direction of flow, wherein the electrical conductors are not disposed directly next to one another but are preferably disposed in mirror symmetry with respect to a mirror axis through the welded joint or soldered or brazed joint. Apart from the connection at the welded joint/soldered or brazed joint, the first honeycomb body is thus held in the exhaust line at a plurality of symmetrically disposed points by the two electrical conductors. Since the gap widths are the same in these regions too (at least in pairs), the outlay for production and/or the number of different variants for the electrical conductors can be further reduced.

In accordance with an additional feature of the invention, provision can furthermore be made for at least one supporting pin to be secured on a circumferential surface of the first honeycomb body. The pin projects into the second honeycomb body and thus connects the first honeycomb body and the second honeycomb body mechanically to one another. It is possible in this case for a plurality of supporting pins to be provided, e.g. 2, 3, 4, 5 or 6, wherein a significantly larger number should be avoided in view of the outlay for production. The circumferential surface refers, in particular, to the periphery or outer surface of the first honeycomb body parallel to the direction of through flow of the exhaust gas (not within the channels but, for example, partially delimiting the gap). The supporting pins are preferably electrically insulated with respect to the first honeycomb body or with respect to the second honeycomb body. The supporting pins are preferably welded and/or soldered or brazed to the circumferential surface of the first honeycomb body. Furthermore, they can be inserted into channels in the second honeycomb body and/or fixed there by welding/soldering or brazing. In particular, one or more supporting pins can be secured on the circumferential surface of the first honeycomb body in such a way that, in addition to the support, they also support the honeycomb body radially against the exhaust line (e.g. by a position in the tapering gap space). The first honeycomb body is held in the exhaust line through the use of the supporting pins. By virtue of the fact that the supporting pins are secured on the outside of the circumferential surface, simple attachment to the first honeycomb body is ensured. Through the use of the supporting pins, the first honeycomb body can be connected to a multiplicity of different second honeycomb bodies.

In accordance with yet another, particularly preferred, feature of the invention, at least the first honeycomb body or the second honeycomb body forms channels through which gas can flow by using at least one wound or coiled stack of at least partially structured sheet metal layers. (At least in the case of the first honeycomb body), the (metal) sheet layers may also form a current-conducting structure, through which the heat-engendering current flows. In particular, the sheet metal layers are metal foils. It is also possible for the sheet metal layers to form only part of the channels walls, e.g. if they are incorporated into some other material of the channels walls.

With the objects of the invention in view, there is furthermore provided a kit, comprising a first honeycomb body having a first cross-sectional area and a plurality of second honeycomb bodies having second cross-sectional areas which differ from one another and are each larger than the first cross-sectional area, and wherein the first honeycomb body and the second honeycomb body are suitable for use in a device according to the invention. According to the invention, only a single variant embodiment of a first honeycomb body is thus required, and, combined with a plurality of different second honeycomb bodies, can be positioned eccentrically and installed in the corresponding exhaust lines. Consequently, only the second honeycomb body has to be selected according to the specifications of the exhaust system, and an independent, low-cost combination with the (small) first honeycomb body can be made from the kit.

With the objects of the invention in view, there is concomitantly provided a motor vehicle, comprising an internal combustion engine, an exhaust system, a device according to the invention formed in the exhaust system, and the first honeycomb body being electrically heatable by using a control device.

With regard to the specific embodiment or operation of the electrically heatable honeycomb body, reference can be made to the content of the disclosure of the documents cited at the outset, especially with respect to the electrical details relating to the manner of heat generation, the formation of current paths and electrical insulators, the structure of the electrical resistors and the like.

Other features which are considered as characteristic for the invention are set forth in the appended claims, noting that the features presented individually in the dependent claims can be combined in any technologically meaningful way and define additional embodiments of the invention.

Although the invention is illustrated and described herein as embodied in a device for the treatment of exhaust gases and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
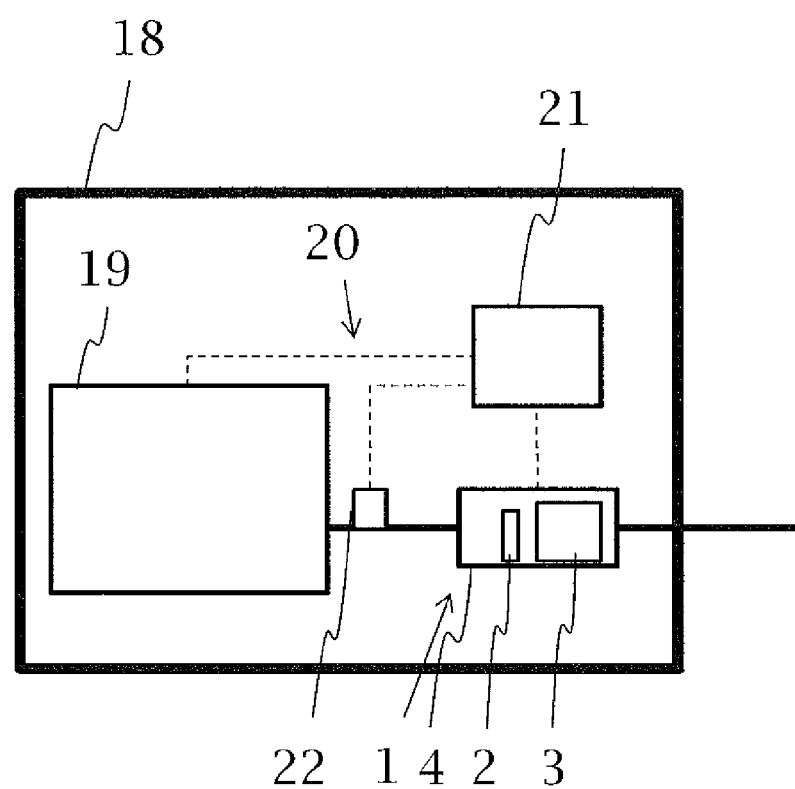
FIG. 1 is a block diagram of a motor vehicle having a device for the treatment of exhaust gases.

Referring now in detail to the figures of the drawings, which show particularly preferred variant embodiments to which the invention is not restricted, and first, particularly, to FIG. 1 thereof, there is seen a motor vehicle 18 having an internal combustion engine 19. An exhaust system 20, having one embodiment of a device 1 for the treatment of exhaust gases, is connected to the internal combustion engine 19. The device 1 includes an exhaust line 4, in which a first honeycomb body 2 and a second honeycomb body 3 are disposed. A sensor 22 for detecting at least one property of the exhaust gas is furthermore connected to the exhaust line 4. The motor vehicle 18 furthermore includes a control device 21, which is connected at least to the internal combustion engine 19, the sensor 22 and/or the device 1.

During operation, the exhaust gas from the internal combustion engine 19 flows through the exhaust line 4 and, first of all, flows through the first honeycomb body 2. The first honeycomb body 2 can be heated electrically and, in a state in which it is activated (by the control device 21), heats the exhaust gas. Finally, pollutants in the exhaust gas are converted catalytically, filtered, adsorbed and/or oxidized, for example, in the second honeycomb body 3, depending on the desired function of the second honeycomb body. The heat introduced into the first honeycomb body 2 can be controlled by the control device 21 in accordance with traveling time, exhaust gas parameters and/or parameters of the internal combustion engine 19.

Figure 2:
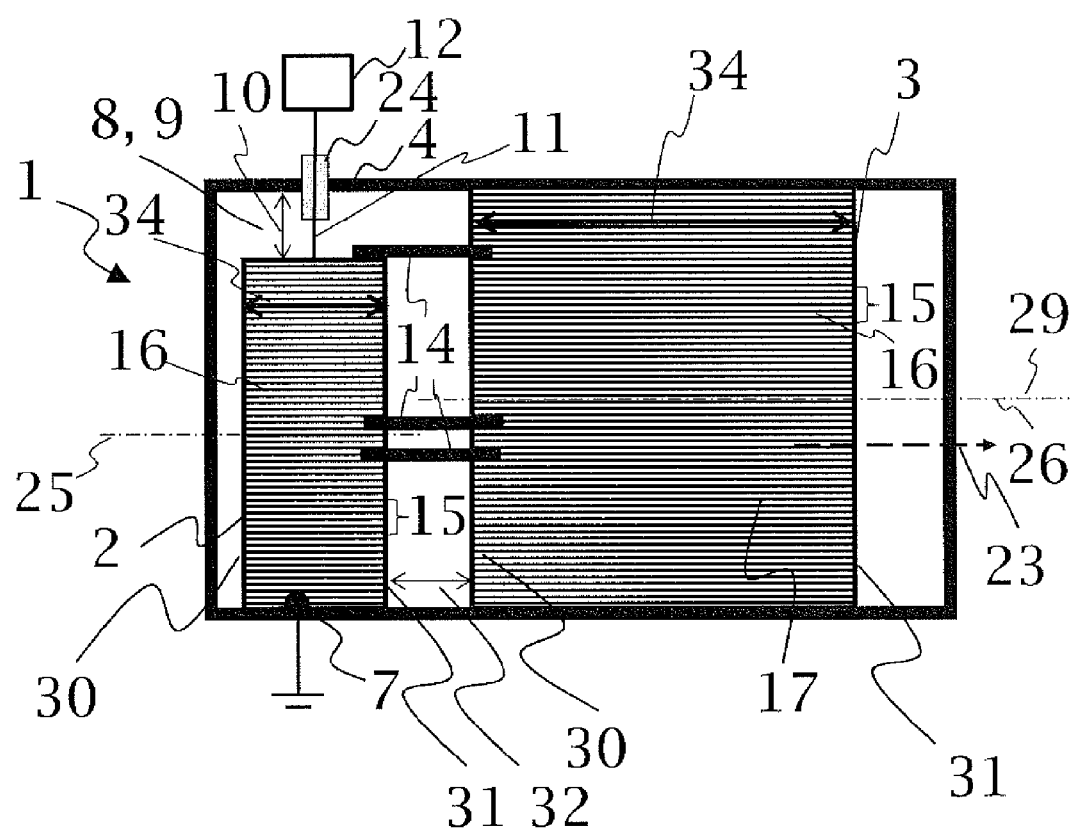
FIG. 2 is a diagrammatic, longitudinal-sectional view of an embodiment of the device for the treatment of exhaust gases.

FIG. 2 diagrammatically illustrates one embodiment of the device 1. The device 1 includes the exhaust line 4, in which the first honeycomb body 2 and the second honeycomb body 3 are disposed. The first honeycomb body 2 and the second honeycomb body 3 are each formed by at least one stack 15 of sheet metal layers 16, which is coiled in such a way that channels 17 are formed in a flow direction 23 of the exhaust gas. The first honeycomb body 2 is embodied as an electrically heatable honeycomb body and is connected to a power source 12 by a (single) electrical conductor 11, which is surrounded by an insulator 24 and is passed through the exhaust line 4, thus enabling the first honeycomb body 2 to be supplied with current. The first honeycomb body 2 is furthermore welded to the exhaust line 4 at a welded joint 7. Alternatively, it is also possible for a soldered or brazed joint to be provided in this case. The second honeycomb body 3 is connected through the exhaust line 4 to electrical ground.

The first honeycomb body 2 has a first central axis 25, which extends in the flow direction 23 and is an axis of symmetry for the first honeycomb body 2. The second honeycomb body 3 has a second central axis 26, which likewise extends in the flow direction 23 and is an axis of symmetry of the second honeycomb body 3. The second central axis 26 is furthermore identical with a center line 29 of the exhaust line 4. The first central axis 25 is thus offset relative both to the center line 29 of the exhaust line 4 and to the second central axis 26 of the second honeycomb body 3, wherein the diameter of the first honeycomb body 2 is smaller than the diameter of the second honeycomb body 3. Due to the eccentric configuration of the first honeycomb body 2, a gap 8 is formed. The gap 8 serves as a through flow opening 9 for the exhaust gas. The gap 8 has a gap width 10 (which changes in the circumferential direction).

It is likewise conceivable for a distance 32 to be provided between an inlet side 30 of the second honeycomb body 3 and the outlet side 31 of the first honeycomb body 2, over which distance the first honeycomb body is supported against the second honeycomb body.

The first honeycomb body 2 is connected to the second honeycomb body 3 by supporting pins 14, which are secured on a circumferential surface 13 of the first honeycomb body 2 and project into the second honeycomb body 3. Electrical contacting between the first honeycomb body 2 and the second honeycomb body 3 is prevented through an appropriate structure of electrically insulating material on and/or in the supporting pins 14. Due to the fact that the first honeycomb body 2 is significantly smaller in cross section than exhaust lines commonly used in the automotive sector, the first honeycomb body 2 can be used for a large number of these exhaust lines.

Figure 3:
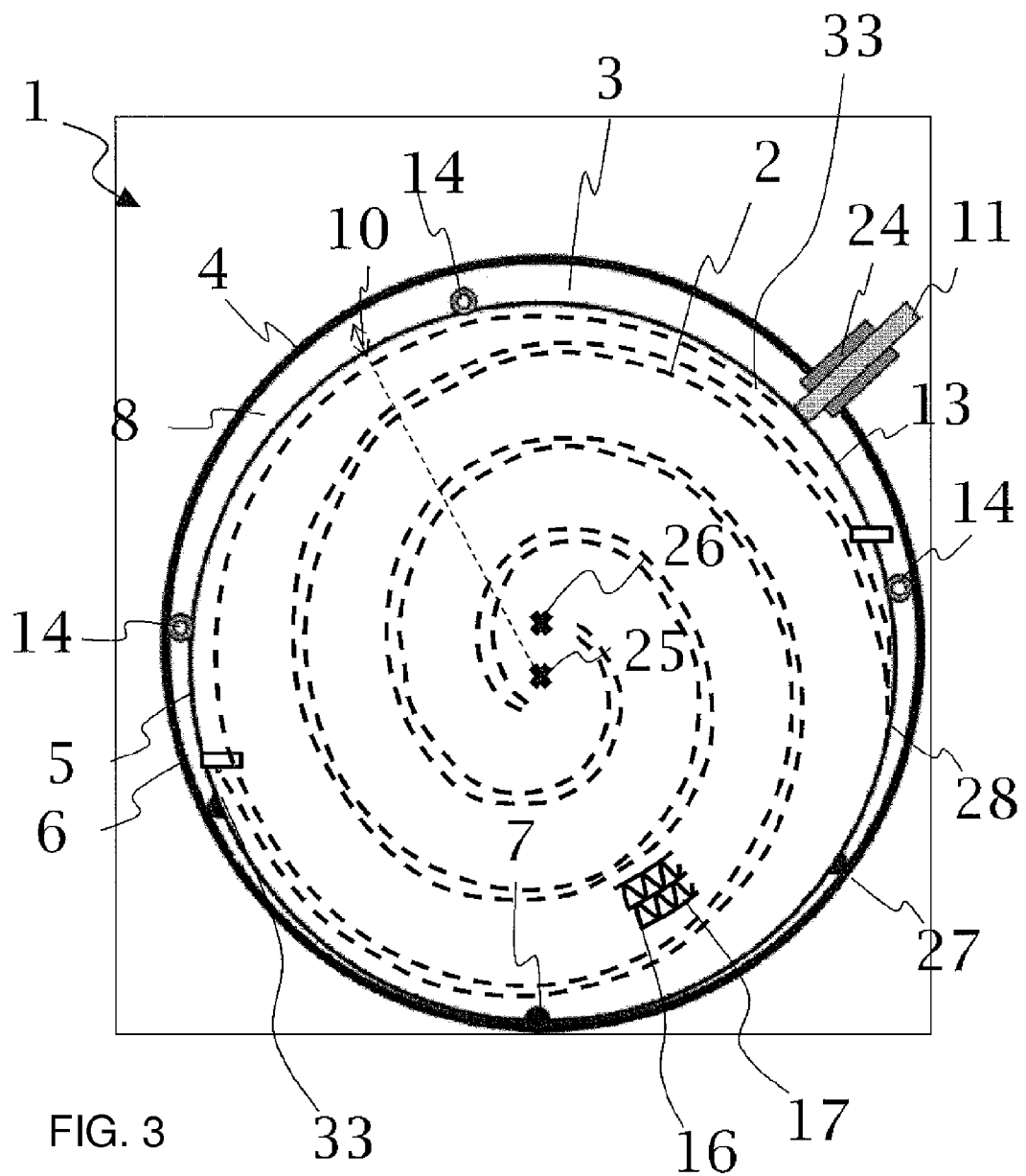
FIG. 3 is a cross-sectional view of an embodiment of the device for the treatment of exhaust gases.

The second honeycomb body 3 is itself not electrically heatable or there is no flow of electric current therethrough. The first honeycomb body 2 is thus electrically insulated with respect to the second honeycomb body 3. In particular, the first honeycomb body 2 and the second honeycomb body 3 are formed by separate components (e.g. sheet metal layers 16). It is furthermore preferred if the ends (inlet side 30 and outlet side 31) of the honeycomb bodies are flat or level, thus making it possible to use (identical) supporting pins 14, in particular, to set a desired distance 32 between them. It is furthermore preferred that all of the sheet metal layers 16 of the honeycomb bodies 2, 3 should rest on a component (formed by a shell 28 or the exhaust line 4) forming a housing at both ends 33 and over an entire axial length 34 of the honeycomb bodies 2, 3. Reference is made to FIG. 1 and FIG. 3 as well by way of example.

FIG. 3 shows a diagrammatic, cross-sectional view through the exhaust line 4 of a device 1, which is also seen in FIG. 2, for example, wherein fundamentally identical elements are provided with identical reference signs. For greater ease of illustration, the channels of the first honeycomb body 2 and the second honeycomb body 3 are not shown therein.

The second honeycomb body 3 completely spans the exhaust line 4 and has the second central axis 26. The first central axis 25 of the first honeycomb body 2 is offset relative to the second central axis 26 of the second honeycomb body 3, and therefore the first honeycomb body 2 is disposed eccentrically both with respect to the exhaust line 4 and with respect to the second honeycomb body 3. By virtue of the eccentric configuration, the gap 8 is formed, having the gap width 10 measured in the radial direction, starting from the first central axis 25.

The first honeycomb body 2 has the two-part shell 28 on the circumferential surface 13. The first honeycomb body 2 can be electrically contacted through the two-part shell 28 which also imparts stability to the first honeycomb body 2. Bulges 27 are furthermore provided on the circumferential surface 13 or shell 28. The first honeycomb body 2 can be soldered or brazed into the exhaust line 4 by using the bulges 27. Moreover, the supporting pins 14 are secured on the shell 28 or circumferential surface 13, extending in the channels 17 of the second honeycomb body 3 and thus fixing the first honeycomb body 2 in the exhaust line 4.

The first honeycomb body 2 has a first cross-sectional area 5, and the second honeycomb body 3 has a second cross-sectional area 6. Moreover, the first honeycomb body 2 is secured in the exhaust line 4 approximately in a punctiform manner by using the welded joint and/or a soldered or brazed joint 7. In this way, the first honeycomb body 2 is also connected in an electrically conductive manner to the exhaust line 4. Moreover, the electrical conductor 11, which is passed through the exhaust line 4 through the insulator 24, is furthermore mounted on the other shell 28.

The teaching according to the invention specifies an electrically heatable honeycomb body which can be connected to a multiplicity of supporting honeycomb bodies and can thus be installed easily in a large number of different vehicle models.

The invention claimed is:

1. A device for the treatment of exhaust gases, the device comprising:
   an exhaust line;
   a first honeycomb body having channels through which the exhaust gas can flow in a flow direction, said first honeycomb body disposed eccentrically in said exhaust line and having a first cross-sectional area and a circumferential surface defining an outer periphery of said first honeycomb body being parallel to said flow direction and facing toward said exhaust line;
   said first honeycomb body being secured in said exhaust line and connected to said exhaust line in an electrically conductive manner by a welded joint or a brazed joint;
   said first honeycomb body and said exhaust line forming a gap therebetween having an angle-dependent gap width;
   at least one electrical conductor extending through said gap and being configured to connect said first honeycomb body to a power source in an electrically insulated manner through said exhaust line;
   a second honeycomb body having channels through which the exhaust gas can flow, said second honeycomb body having a second cross-sectional area larger than said first cross-sectional area and said second honeycomb body disposed in series with said first honeycomb body in said exhaust line; and
   at least one supporting pin disposed inside said exhaust line, secured directly on an outside of said circumferential surface of said first honeycomb body and partially delimiting said gap, said at least one supporting pin projecting into at least one of said channels of said second honeycomb body and directly mechanically interconnecting said first honeycomb body and said second honeycomb body.

2. The device according to claim 1, wherein said gap forms a through flow opening.

3. The device according to claim 1, wherein said at least one electrical conductor includes a plurality of electrical conductors configured to connect said first honeycomb body to respective power sources, and said electrical conductors are connected to said first honeycomb body in vicinity of equal gap widths.

4. The device according to claim 1, which further comprises at least one other supporting pin secured in at least one of said channels of said first honeycomb body, said at least one other supporting pin projecting into at least one of said channels of said second honeycomb body and mechanically interconnecting said first honeycomb body and said second honeycomb body at said first and second cross-sectional areas.

5. The device according to claim 1, wherein at least one of said first honeycomb body or said second honeycomb body has at least one wound or coiled stack of at least partially structured sheet metal layers forming channels through which the exhaust gas can flow.

6. A device for the treatment of exhaust gases, the device comprising:
- an exhaust line;
- a first honeycomb body having channels through which the exhaust gas can flow in a flow direction, said first honeycomb body having a first cross-sectional area and a circumferential surface defining an outer periphery of said first honeycomb body being parallel to said flow direction and facing toward said exhaust line;
- said first honeycomb body secured in said exhaust line and connected to said exhaust line in an electrically conductive manner by a welded joint or a brazed joint;
- said first honeycomb body and said exhaust line forming a gap therebetween having an angle-dependent gap width;
- at least one electrical conductor extending through said gap and configured to connect said first honeycomb body to a power source in an electrically insulated manner through said exhaust line;
- a second honeycomb body having channels through which the exhaust gas can flow, said second honeycomb body having a second cross-sectional area larger than said first cross-sectional area;
- said first honeycomb body and said second honeycomb body disposed in series and interconnected;
- said first honeycomb body disposed eccentrically relative to said second honeycomb body; and
- at least one supporting pin disposed inside said exhaust line, secured directly on an outside of said circumferential surface of said first honeycomb body and partially delimiting said gap, said at least one supporting pin projecting into at least one of said channels of said second honeycomb body and directly mechanically interconnecting said first honeycomb body and said second honeycomb body.

7. The device according to claim 6, wherein said gap forming a through flow opening.

8. The device according to claim 6, wherein said at least one electrical conductor includes a plurality of electrical conductors configured to connect said first honeycomb body to respective power sources, and said electrical conductors are connected to said first honeycomb body in vicinity of equal gap widths.

9. The device according to claim 6, which further comprises at least one other supporting pin secured in at least one of said channels of said first honeycomb body, said at least one other supporting pin projecting into at least one of said channels of said second honeycomb body and mechanically interconnecting said first honeycomb body and said second honeycomb body at said first and second cross-sectional areas.

10. The device according to claim 6, wherein at least one of said first honeycomb body or said second honeycomb body has at least one wound or coiled stack of at least partially structured sheet metal layers forming channels through which the exhaust gas can flow.

11. A motor vehicle, comprising:
- an internal combustion engine;
- an exhaust system including said device according to claim 1; and
- a controller configured to control electrical heating of said first honeycomb body.

12. A motor vehicle, comprising:
- an internal combustion engine;
- an exhaust system configured to receive exhaust gas from said internal combustion engine and including said device according to claim 6; and
- a controller configured to control electrical heating of said first honeycomb body.

* * * * *